__United States Patent__ [19]

Schreyer

[11] 3,846,978

[45] Nov. 12, 1974

[54] JOINER LINK PIN RETAINER

[75] Inventor: Kenneth D. Schreyer, Clarence, N.Y.

[73] Assignee: Columbus McKinnon Corporation, Tonawanda, N.Y.

[22] Filed: Apr. 20, 1973

[21] Appl. No.: 352,924

[52] U.S. Cl. .................................................. 59/85
[51] Int. Cl. ............................................. F16g 15/04
[58] Field of Search .......... 59/85, 86; 403/372, 229; 16/169

[56] References Cited
UNITED STATES PATENTS

| 636,330 | 11/1899 | Glover | 16/169 |
|---|---|---|---|
| 1,463,657 | 7/1923 | Nelson | 24/265 B |
| 1,498,070 | 6/1924 | Beucke | 24/265 B |
| 1,829,657 | 10/1931 | Jones | 403/229 |
| 2,890,072 | 6/1959 | Kaman | 403/372 |
| 3,104,519 | 9/1963 | Kelting | 59/86 |
| 3,134,221 | 5/1964 | Bergman | 59/85 |
| 3,373,560 | 3/1968 | Manney | 59/85 |
| 3,453,822 | 7/1969 | Crook | 59/85 |

FOREIGN PATENTS OR APPLICATIONS 6,413,845 5/1965 Netherlands ............................ 59/85

*Primary Examiner*—C. W. Lanham
*Assistant Examiner*—Gene P. Crosby
*Attorney, Agent, or Firm*—Bean & Bean

[57] ABSTRACT

A joiner link having a pair of link halves, an essentially uniform diameter pin passing through aligned openings in spaced legs of the link halves for pivotally interconnecting the link halves, and a retainer device surrounding the pin intermediate the spaced legs for constraining the pin from joiner link disassembling movements axially from within the leg openings. The retainer device includes a protective outer sleeve dimensioned to extend between the spaced legs and a coil spring arranged radially intermediate the pin and outer sleeve; the coil spring frictionally constraining the pin from disassembling movements and cushioning external load induced movements of the outer sleeve towards the pin.

3 Claims, 2 Drawing Figures

PATENTED NOV 12 1974   3,846,978

JOINER LINK PIN RETAINER

BACKGROUND OF THE INVENTION

Pin retainers of the type including a resiliently deformable device, which is dimensioned to frictionally grip a uniform diameter pin when driven axially thereinto in order to thereafter normally prevent disassembling axial movements of the pin, have been proposed for use with joiner link constructions, as evidenced for example by U.S. Pat. Nos. 3,104,519 and 3,453,822, as well as with diverse other constructions, as evidenced for example by U.S PAT. No. 636,330; 1,463,657; 1,498,070 and 1,829,657.

SUMMARY OF THE INVENTION

The present invention relates to an improved pin retainer, and particularly to a pin retainer having utility in joiner link constructions.

In accordance with the present invention, two identical link halves of a joiner link are each provided with mating legs or ears having holes of essentially uniform diameter passing therethrough. A coupling pin of essentially uniform diameter is passed through the leg openings to position end portions thereof within the openings for the purpose of pivotally interconnecting the link halves. A retainer is disposed about a central portion of the pin for frictional engagement therewith and for end engagement with the legs of the link halves in order to normally prevent uncoupling axial movements of the pin end portions from within the leg openings.

In a preferred form of the present invention, the retainer device includes a relatively rigid metal outer sleeve and a coil spring arranged radially intermediate and in frictional surface engagement with the pin and the outer sleeve. Specifically, the coil spring includes enlarged diameter coil end portions, which engage against the inner surface of the outer sleeve in order to permit the spring and sleeve to be shipped as a factory pre-assembled unit; an intermediate reduced diameter coil portion, which frictionally engages or grips about the pin; and joining or coupling portions, which normally serve to maintain the enlarged diameter coil portions and thus the outer sleeve disposed concentrically of the pin, while "cushioning" external load induced movement of the outer sleeve relatively towards the pin. Additionally, the end portions of the spring serve to automatically align the intermediate portion with the pin when the latter is driven into the retainer device, during the joiner link assembling operation.

DRAWINGS

The nature and mode of operation of the present invention will now be more fully described in the following detailed description taken with the accompanying drawings wherein:

FIG. 1 is a partially sectionalized view showing a joiner link construction in accordance with the present invention; and FIG. 2 is an enlarged sectionalized view of the area generally designated as FIG. 2 in FIG. 1.

DETAILED DESCRIPTION

Figure 1:
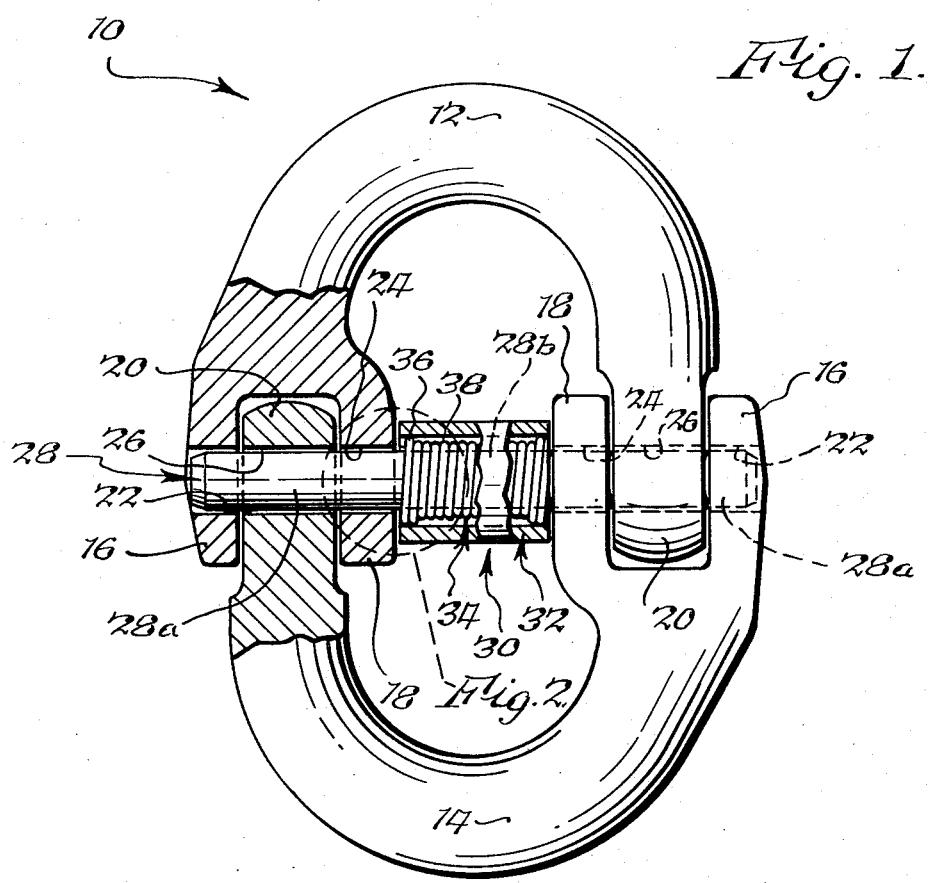

Reference is now made particularly to FIG. 1 wherein a joiner link assembly formed in accordance with the present invention is generally designated as 10 and shown as including complimentary link halves 12 and 14 of the type having their opposite ends shaped to define a pair of legs or ears 16 and 18 and a single leg or ear 20. These several legs are provided with openings 22, 24 and 26, which when registered or aligned, as shown in FIG. 1, permit the insertion therethrough of an essentially uniformed diameter joiner pin 28 to pivotally join the link halves. Pin 28 may be considered as having end portions 28a journally within the leg openings and a central portion 28b extending between spaced legs 18.

In accordance with the present invention, pin 28 is removably retained or secured within openings 22, 24 and 26 against inadvertent or accidental axial dislodgement by an improved retainer device or unit, which is generally designated as 30 and arranged to grip pin central portion 28b.

Retainer device 30 generally includes a rigid or relatively non-deformable outer sleeve 32, which has a length sufficient to extend substantially the distance between legs 18; and a resiliently deformable inner sleeve 34, which has a length equal to or slightly less than sleeve 32 and is formed with radially deformable relatively large diameter end and small diameter intermediate portions 36 and 38, respectively. Outer sleeve 32 may be conveniently formed for instance from relatively thick walled steel tubing, while inner sleeve 34 is preferably in the form of a metal coil spring having relatively enlarged and reduced size coil portions for forming portions 36 and 38. An alternate construction would feature the use of an outer sleeve formed of a tough, high strength plastic material, which may be capable of undergoing a slight degree of resilient deformation.

In the preferred construction, the coils of intermediate portion 38 are dimensioned to tightly engage or frictionally grip about the surface of pin 28, while being when expanded thereby spaced inwardly from the inner surface 40 of outer sleeve 32. On the other hand, the coils of portions 36 are dimensioned to engage against outer sleeve inner surface 40, while being when compressed thereby spaced from pin 28. This spacing of the inner and outer surfaces of the coils of portions 36 and 38 from pin 28 and outer sleeve 32, respectively, permits the outer sleeve to move radially towards or tilt relative to the pin when subjected to externally applied loadings. End and intermediate portion connecting or joining coils 42 of the spring normally serving to retain the outer sleeve disposed concentrically of the pin and resiliently oppose or cushion relative movement therebetween.

Figure 2:
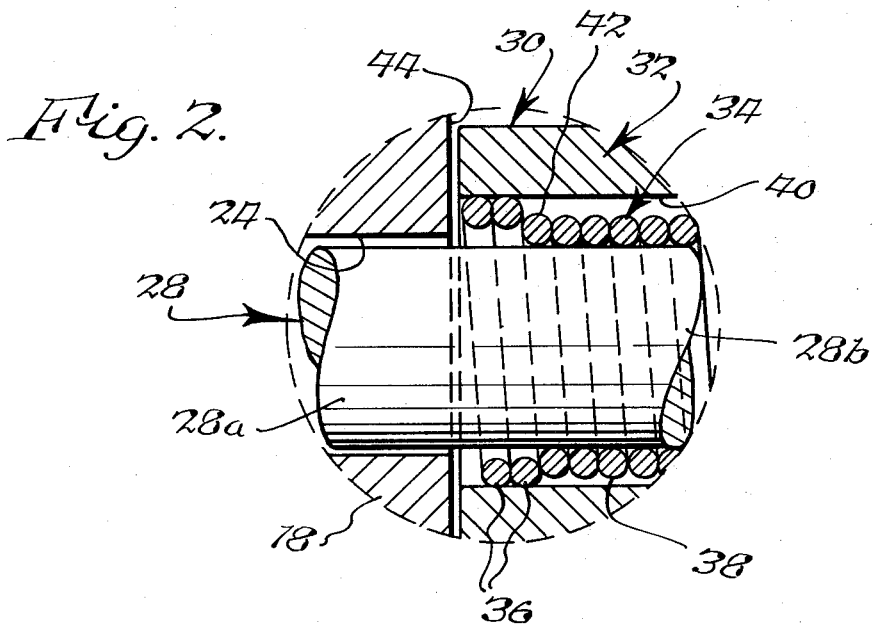

It is important to note by referring to FIG. 2 that the inner diameter of end portions 36 is in excess of the diameter of adjacent leg openings 24, such that the radially extending or side surface 44 of legs 18 may serve as end abutment surfaces for the ends of both the outer sleeve and the spring when they are disposed about pin central portion 28b.

As a practical matter, the degree of interference fit between portions 36 and outer sleeve 32 need not be as great as that between portion 38 and pin 28. In this respect, portions 36 need only be deformed to an extent sufficient to permit retainer device 30 to be preassembled at the factory and then be shipped for field use without the parts becoming separated under normal handling conditions. By providing a preassembled retainer device, a joiner link may be readily assembled in the field by merely placing retainer device 30 intermediate legs 18 in alignment with openings 22, 24 and 26 and then driving pin 28 axially therethrough, as by means of a hammer. As will be apparent, the driving of pin 28 through the retainer device will serve to expand intermediate portion 38 to an extent sufficient to prevent axial displacement of the pin from within the retainer device and thus the leg openings, until it is intentionally removed as by being driven out by means of a hammer and punch. During a pin driving or link assembling operation, one or the other of end portions 36 will serve to automatically align intermediate portion 38 to receive the pin.

During use of the thus assembled joiner link, the outer sleeve serves to protect the coil spring from damage, whereas the coil spring serves to cushion blows applied to the outer sleeve as well as to frictionally retain the joiner pin in properly assembled position.

The simplified and rugged construction of the present retainer device provides for long expectant life, as well as a re-use capability. Prior to re-use, the condition of the retainer device may be determined by simple visual inspection.

I claim:

1. In a joiner link including a pair of substantially U-shaped complementary link halves, said link halves having leg portions formed with through openings, a pin for pivotally joining said link halves, said pin having end portions passing through said openings and a central portion disposed between said leg portions, and a pin retainer disposed about said central portion of said pin to abut against said leg portions for normally constraining said pin from uncoupling movement axially through said openings, the improvement wherein said pin retainer comprises in combination:

an outer sleeve having a length to extend substantially between for end abutment with said leg portions; and a variable diameter inner sleeve disposed radially intermediate said pin and said outer sleeve, said inner sleeve having enlarged diameter portions and a reduced diameter portion, said inner sleeve portions being resiliently deformable in a direction radially thereof, characterized in that said reduced diameter portion is dimensioned to resiliently grip said pin without engaging an inner surface of said outer sleeve, said enlarged diameter portions are dimensioned to resiliently grip said inner surface of said outer sleeve without engaging said pin, said enlarged diameter portions are arranged adjacent opposite ends of said inner sleeve, and said enlarged diameter portions additionally form guides for directing insertion of an end of said pin axially into said reduced diameter portion.

2. The joiner link according to claim 1, wherein said inner sleeve is a coil spring and said enlarged diameter portions are defined by enlarged diameter coils disposed adjacent opposite ends of said spring.

3. The joiner link according to claim 2, wherein the axial length of said spring is substantially equal to the axial length of said outer sleeve, and said outer sleeve is rigid and possesses resistance to deformation when compared to said spring.

* * * * *